United States Patent [19]
Fraser et al.

[11] Patent Number: 5,565,073
[45] Date of Patent: Oct. 15, 1996

[54] ELECTROCHEMICAL PEROXIDE GENERATOR

[76] Inventors: Mark E. Fraser; Alan S. Woodman; Everett B. Anderson; E. Jennings Taylor, all of PSI Technology Co., 20 New England Business Center, Andover, Mass. 01810

[21] Appl. No.: 463,752

[22] Filed: Jun. 5, 1995

Related U.S. Application Data

[62] Division of Ser. No. 276,178, Jul. 15, 1994.

[51] Int. Cl.$^6$ .................................................. C25B 9/00
[52] U.S. Cl. .......................... 204/256; 204/265; 204/266
[58] Field of Search .................................. 204/255, 263, 204/256, 265, 290 R, 277

[56] References Cited

U.S. PATENT DOCUMENTS

| | | | |
|---|---|---|---|
| 3,459,652 | 8/1969 | Grangaard | 204/294 |
| 3,462,351 | 8/1969 | Grangaard | 204/83 |
| 3,506,560 | 4/1970 | Grangaard | 204/263 |
| 3,507,769 | 4/1970 | Grangaard | 204/265 |
| 3,592,749 | 7/1971 | Grangaard | 204/84 |
| 3,607,687 | 9/1971 | Grangaard | 204/84 |
| 3,856,640 | 12/1974 | Halfar et al. | 204/84 |
| 3,969,201 | 7/1976 | Oloman et al. | 204/83 |
| 4,118,305 | 10/1978 | Oloman et al. | 204/277 |
| 4,350,575 | 9/1982 | Porta et al. | 204/84 |
| 4,357,217 | 11/1982 | Kuehn et al. | 204/84 |
| 4,384,931 | 5/1983 | Jasinski et al. | 204/84 |
| 4,406,758 | 9/1983 | McIntyre et al. | 204/98 |
| 4,430,177 | 2/1984 | McIntyre et al. | 204/98 |
| 4,511,441 | 4/1985 | McIntyre et al. | 204/98 |
| 4,693,794 | 9/1987 | Chiang | 204/84 |
| 4,969,981 | 11/1990 | Rogers et al. | 204/84 |
| 5,041,195 | 8/1991 | Taylor et al. | 204/290 R |
| 5,316,629 | 5/1994 | Clifford et al. | 204/83 |
| 5,358,609 | 10/1994 | Drackett | 204/84 |
| 5,410,052 | 4/1995 | Smith et al. | 544/22 X |

OTHER PUBLICATIONS

Foller, P. C. et al, "The Use of Gas Diffusion Electrodes in the On-Site Generation of Oxidants and Reductants", a paper presented at The Fifth International Forum on Electrolysis in the Chemical Industry, Nov. 10 to 14, 1991, Fort Lauderdale, Florida (10 pp., including Abstract and FIGS. 1 and 2).

*Primary Examiner*—Kathryn Gorgos

[57] ABSTRACT

In the disclosed electrochemical cell for the production of an alkaline solution of peroxide, especially on-site production, the electrolyte is divided into an aqueous alkaline catholyte and an aqueous alkaline anolyte, and the cathode is a gas-diffusion electrode. The active material of the electrolyte side of the gas-diffusion cathode comprises a particulate catalyst support material having a surface area of about 50 to about 2000 m$^2$/g, and, deposited on the particles of this support material, 0.1 to 50 weight-%, based on the weight of the active layer, of gold or gold alloy poly-crystal particles having an average size $\geq 5$ but less than about 20 nanometers. These poly-crystal gold or gold alloy particles have a structure consisting essentially of combined individual monocrystals and are substantially selectively catalytic for the reduction of oxygen to peroxide ion or hydrogen peroxide (e.g. HOO$^\ominus$). The electrolyte flow patterns are designed to avoid loss of peroxide resulting from oxidation at the anode. In the operation of the cell, a product with a hydroxyl:perhydroxyl ratio less than 2:1 can be obtained.

14 Claims, 1 Drawing Sheet

ELECTROCHEMICAL PEROXIDE GENERATOR

STATEMENT AS TO FEDERALLY SPONSORED RESEARCH

Work related to this invention was supported by a grant from the National Science Foundation (NSF Contract Nos. ISI-9060179 and ISI-9203023).

This application is a division of application Ser. No. 08/276,178, filed Jul. 15, 1994, pending.

BACKGROUND OF THE INVENTION

1. Field of the Invention

This invention relates to electrochemical cells designed to synthesize peroxide ($HOO^\ominus$, $O_2^\ominus$, or $H_2O_2$ dissolved in an alkaline medium) by cathodic reduction of an oxygen-containing gas and to processes for operating such cells. An aspect of this invention relates to electrochemical cells for the synthesis of peroxide wherein the electrolyte is divided into an aqueous alkaline catholyte and an aqueous alkaline anolyte. Another aspect of this invention relates to a process for synthesizing peroxide which can be operated at relatively low cell voltages and relatively high current densities and efficiencies.

2. Description of the Prior Art

It has long been known that hydrogen peroxide can be synthesized electrochemically, taking advantage of modern advances in electrochemical cell technology. The patent literature published on this subject in the late 1960's and early 1970's took into consideration the possibility of using a gas-diffusion cathode. A "gas-diffusion electrode" is normally considered to comprise a structure which is gas permeable on one major surface (sometimes called the "gas side") and electrocatalytic on the opposite major surface, which opposite surface is in contact with the electrolyte and is sometimes called the "electrolyte side". The electrolyte is permitted to permeate into the electrolyte side to a degree sufficient to provide a multi-phase interface between a gaseous reactant, a solid electrocatalytic material, and the electrolyte (which is generally a liquid). However, significant permeation of electrolyte through pores or interstices within the catalytic material of the gas-diffusion electrode at a significant flow rate is neither necessary nor desirable.

For a representative sampling of disclosures from this late-1960's/early 1970's period, see the several U.S. patents issued to Grangaard, e.g. U.S. Pat. No. 3,459,652 Aug. 5, 1969), U.S. Pat. No. 3,462,351 Aug. 19, 1969), U.S. Pat. No. 3,507,769 (Apr. 21, 1970), U.S. Pat. No. 3,592,749 (Jul. 13, 1971), and U.S. Pat. No. 3,607,687 (Sep. 21, 1971), These disclosures typically contemplate a generally free-flowing catholyte which takes up peroxide (generally in the form of $HO_2^\ominus$ dissolved in the alkaline catholyte) and is withdrawn from the cell for the purpose of recovering a product which is intended to be directly useful in industry, e.g. as an alkaline bleach solution.

Experts in the electrochemical synthesis art found the performance of the Grangaard cells to be very disappointing, however, and by the mid-1970's, even the fundamental principles upon which the Grangaard concepts were based were being called into question. For example, according to Oloman and his coworkers, see U.S. Pat. Nos. 3,969,201 and 4,118,305, issued Jul. 13, 1976 and Oct. 3, 1978, respectively, the Grangaard cells produced an aqueous alkaline product having a peroxide concentration of only about 0.5% with an $NaOH/H_2O_2$ ratio (by weight percent) of 4:1 (of U.S. Pat. No. 3,459,652). As is known in the art, some uses of bleaching solution, e.g. in the pulp and paper industry, generally call for much higher concentrations of peroxide and/or for $NaOH/H_2O_2$ ratios in the range of about 1:1 to about 2:1. Oloman et al, among others, questioned the basic idea of utilizing a gas-diffusion cathode of the classical structure wherein catholyte merely permeates into the electrode structure from the electrolyte side. Thus, by the mid- to late 1970's, prior art workers were directing their attention to cathode structures constructed from a fluid-permeable, electrically conductive mass (e.g. a bed of conductive catalytic particles or a fixed, porous conductive catalytic matrix) with sufficient porosity to permit a constant trickle or flow of electrolyte through the entire volume (or most of the volume) of the cathode mass. In an electrochemical cell provided with such a fluid-permeable, electrically conductive cathode mass, the cathode can, if desired, fill up the entire cathode compartment, so that all or most of the catholyte is confined to the interior of the cathode mass.

In subsequent developments based upon the packed-bed or porous matrix concept of a cathode, the cathode was in some cases placed in contact with a non-conducting porous matrix (such as a felt) or was employed in a cell having in essence a single electrolyte rather than an electrolyte divided into catholyte and anolyte.

In many patent disclosures illustrating the packed-bed or porous matrix concept of a cathode, the product (generally an alkaline solution of peroxide, most typically catholyte which has been passed through the cathode mass) is collected from an end or edge or other portion of the cathode mass, rather than from a generally free-flowing catholyte which has merely contacted and/or permeated to some degree a surface of the cathode. Alternatively, the product is essentially catholyte which has wicked through a non-conductive, porous mass such as a felt which is in contact with the cathode.

Peroxide-generating cells containing packed-bed or porous-matrix cathodes have in recent years become commercially available for use as on-site peroxide generators, and considerable effort has gone into the optimization of their performance. However, these commercially available cells operate at overall cell potentials ($E_{cell}$) of about 2.0 V and current densities not significantly exceeding 60 amperes per square foot (about 64.5 $mA/cm^2$=645 $A/m^2$). Even assuming a current efficiency of 85 to 90%, a large amount of electrode surface area is required in a typical commercial installation, resulting in higher capital costs to the industrial user.

Moreover, the packed-bed or porous matrix concept of cathode construction has not provided any improvement in quality control as compared to cells utilizing gas-diffusion cathodes. The packed bed or porous matrix can develop "hot spots" in which current densities, etc. are higher than average for the bed or matrix as a whole, thereby creating the risk that some part of the cathode might become "starved" for three-phase interface sites and can place the entire bed or matrix at risk of catastrophic failure. This risk can be reduced through the use of a significant stoichiometric excess of oxygen, but non-uniform consumption of oxygen throughout the cathode bed or matrix still contributes to poor quality control. In addition, bipolar cell construction, with stacking of cells for more efficient overall operation, is problematic, due to the variability in the performance of individual cells.

Accordingly, despite significant advances in the field of on-site electrosynthesis of peroxide over the last twenty years, cell performance is still in need of substantial improvement.

SUMMARY OF THE INVENTION

It has now been discovered that the performance of electrochemical peroxide synthesis cells and processes in terms of operating potentials, range of current densities, cathode lifetime, and the resulting system capital costs can be markedly improved through the use of an electrochemical catalytic material containing gold particles and through the use of a generally free-flowing catholyte which inhibits loss of peroxide due to oxidation of perhydroxyl ion at the anode of the cell. Owing to a unique cathode preparation process incorporating the gold catalyst, the relatively poor performance of the Grangaard cells is not observed during the practice of this invention.

Thus, an electrochemical cell of this invention comprises:

a partitioning means (such as a fluid-permeable separator) for partitioning the cell into an anode compartment and a cathode compartment, the anode compartment containing an anode and an aqueous alkaline anolyte, a cathode compartment defining a space containing a generally free-flowing aqueous alkaline catholyte, a gas-diffusion cathode having two major surfaces (the cathode occupies, at most, only a minor proportion of the volume of this space), the space defined by the cathode being constructed and arranged to permit generally unrestricted flow of the aqueous alkaline catholyte across one of the major surfaces of the gas-diffusion cathode, i.e. the "electrolyte side" (the other major surface of the cathode, i.e. the "gas side", is in contact with oxygen-containing gas). A catholyte withdrawal means permits withdrawal of the spent catholyte, which is the desired product of peroxide dissolved in an aqueous alkaline medium.

The electrolyte side of the cathode comprises an electrochemically active material which is composed of:

a particulate catalyst support material having a surface area, by the B.E.T. method, of about 50 to about 2000 $m^2/g$, deposited on the particles of catalyst support material of the active layer, 0.1 to 50 weight-%, based on the weight of the active layer, of a particulate elemental metal comprising gold particles having an average size, measured by transmission electron microscopy, which is greater than about 4 but less than about 20 nanometers, this particulate elemental metal being substantially selectively catalytic for the reduction of oxygen to peroxide ion or hydrogen peroxide, and preferably, a gas-permeable, electrically conductive support material on which the active material is deposited. The active material is preferably rendered hydrophobic by including in it at least 30% by weight, based on the weight of the active layer, of hydrophobic polymer.

Electrical leads in electrical contact with the anode and the cathode of the cell are provided for the external electrical circuit. If desired, the cell can be bipolar and can be electrically connected to one or more additional cells.

In the process of operating this electrochemical cell, the overall cell potential ($E_{cell}$) need not exceed 2 volts and can be less than 1.5 V; current densities can range from 700 to 2,000 $A/m^2$ (70 to 200 $mA/cm^2$) or more, yet current efficiencies do not suffer and are typically in the range of about 85 to about 95%. In addition, current densities in excess of 300 $mA/cm^2$ are attainable. Since the size, and, therefore, the cost, of a commercial system is a direct linear function of the electrode area, a substantial improvement in sustainable current density will significantly reduce the system capital costs. This outstanding performance can be obtained under near ambient operating conditions, including temperatures in the range 35°–40° C. The hydroxide/peroxide ratio of the resulting product is well-controlled but variable in accordance with the desired use and, hence, can vary from about 1.6:1 to all higher values. The peroxide yields associated with these product ratios are typically 3–5 wt %.

BRIEF DESCRIPTION OF THE DRAWING

In the accompanying Drawing, wherein like reference numerals denote like parts in the various embodiments of the invention.

DETAILED DESCRIPTION

Figure 1:
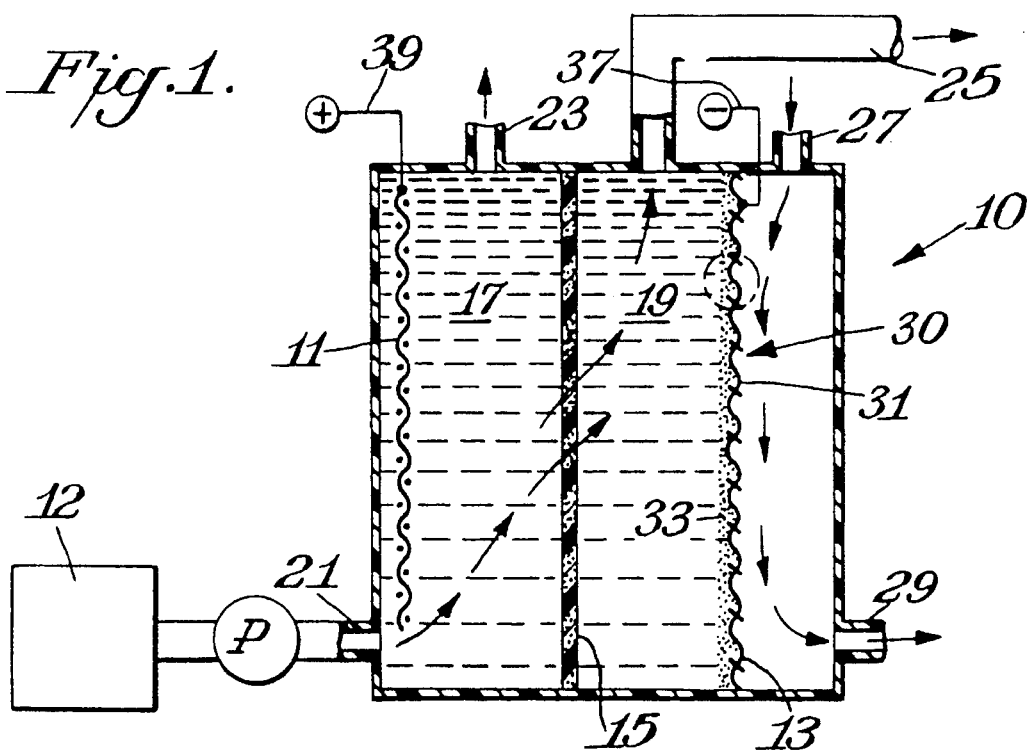
FIG. 1 is a schematic view of a relatively simple embodiment of an electrosynthesis cell of this invention which employs an anolyte-to-catholyte flow and, therefore, requires only one electrolyte inlet and one electrolyte outlet.

Turning first to the Drawing, FIG. 1 illustrates an embodiment of an electrochemical synthesis cell 10 of this invention which is desirable from the standpoint of simplicity. Cell 10 comprises an anode 11, a gas-diffusion cathode 30, a fluid-permeable cell divider or separator 15, an anode lead 39, a cathode lead 37, an inlet 21 for the flowing electrolyte, an outlet 23 located near anode 11 for the release of oxygen generated during cell operation, an outlet 25 for the flowing electrolyte, an inlet 27 located near the "gas side" of cathode 30 for the introduction of an oxygen-containing gas, and an outlet 29 for excess oxygen-containing gas. The electrolyte introduced in to inlet 21 is supplied from a source 12 external to cell 10.

Figure 3:
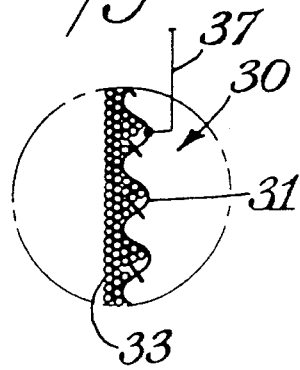
FIG. 3 is a greatly enlarged fragmental cross-sectional view of the cathode 30 shown in FIG. 1.

Separator 15 divides cell 10 into an anode compartment 17, which is constantly filled with continuously flowing anolyte, and cathode compartment 19, which is constantly filled with continuously flowing catholyte, but separator 15 is porous and has sufficient porosity to permit flow-through of electrolyte and, hence, migration of ions between compartments 17 and 19. Cathode 30 (see also FIG. 3) has a typical gas-diffusion electrode structure comprising an electrically conductive sheet-like gas-permeable support material 31 upon which is superposed an electrocatalytically active material 33 comprising high surface area particles upon which tiny particles of gold or a gold alloy have been deposited. Active material 33 preferably also contains a hydrophobic binder material, e.g. a highly fluorinated olefinic polymer or other polyhalohydrocarbon such as polytetrafluoroethylene, in an amount greater than 25% by weight, based on the weight of the active material 33, most preferably about 50 to 70 weight-%. Amounts greater than about 75 or 80 weight-% can have an unacceptable adverse impact upon performance without increasing cathode life significantly as compared to the 70 weight-% level of binder. Support material 31 can be a carbon cloth, carbon paper, or teflonated metal screen which serves as a current collector and which is sufficiently hydrophobic (or has been treated with a hydrophobic polymer such as a polyhalohydrocarbon e.g. polytetrafluorethylene) to prevent flow-through of catholyte. Cathode lead 37 is electrically connected to the support material 31.

An external circuit means (not shown) provides an electrical pathway between anode 11 and cathode 30.

In operation, a fresh aqueous alkaline medium is introduced through inlet 21 into anode chamber 17 to refresh the anolyte, which is constantly being depleted of hydroxyl ion in accordance with half-cell reaction (1):

$$2OH^0 \rightarrow \tfrac{1}{2}O_2 + H_2O + 2e^0 \tag{1}$$

and which does not receive an adequate flow of hydroxyl ion from the cathode compartment 19, even under the most ideal circumstances, since the half-cell reaction occurring at the cathode, for every two electrons accepted, produces only one mole of hydroxyl ion in accordance with half-cell reaction (2):

$$O_2 + H_2O + 2e^0 \rightarrow HO_2^0 + OH^0 \tag{2}$$

The electrolyte introduced into anode compartment 17 becomes part of the anolyte, but it also passes through the pores of separator 15 into cathode compartment 19 and out of the cell 10 through outlet 25 at a rate selected to limit the limit migration of perhydroxyl ion into the anode component 17. That is, the direction of flow of electrolyte is maintained (with the aid of a pump) in an anolyte-to-catholyte direction, which is counter to the natural diffusion of hydroxyl ions from cathode compartment 19 to anode compartment 17 and, more importantly, is counter to the tendency of perhydroxyl ions ($HO_2^0$) to migrate into the anode chamber 17, where they are exposed to possible oxidation to oxygen. This undesirable side reaction, represented below by half-cell reaction (3)

$$HO_2^0 + OH^0 \rightarrow O_2 - H_2O + 2e^0 \tag{3}$$

results in the loss of valuable peroxide product and is highly detrimental to the objectives of this invention.

The spent catholyte, so to speak, which exists the cell through outlet 25, is the desired product of the electrosynthesis. Thus, outlet 25 serves as the means for recovering the alkaline solution of peroxide which can be used as a bleaching agent or oxidizing agent or solubilizing agent for treating pulp, paper, and other industrial products. The alkalinity and the peroxide content in outlet 25 can be controlled, according to this invention, over a surprisingly broad range by controlling the parameters of cell operation, including electrolyte flow and the like. Generally speaking, the solution in outlet 25 has an alkalinity and a peroxide content which has been carefully matched to the industrial needs prevailing at the site of cell 10, so that cell 10 can serve as an on-site peroxide generator, making just enough peroxide to satisfy current demand, no more and no less. On-site generation of peroxide avoids storage of peroxide and purchase of highly concentrated peroxide from outside sources, both of which are undesirable and can even be hazardous.

The catholyte in cathode chamber 19 flows along the surface of active material 33 of cathode 30 and permeates into active material 33 to a considerable degree, but does not flow through cathode 30 in the manner catholytes fed to packed-bed or porous matrix cathodes, for several reasons. First, support material 31, though permeable to gas, is hydrophobic and will not permit aqueous media to pass through it. Second, the volume of active material 31 is very small compared to the volume of a packed-bed cathode, and it will not accommodate a voluminous flow of liquid. Moreover, the porosity of cathode 30 is generally in the form of very fine pores which are better suited to capillary action than high flow rates. In any event, cathode chamber 19 and cathode 30 are designed to provide a fairly rapid flow of catholyte parallel to the surface of cathode 30.

Figure 2:
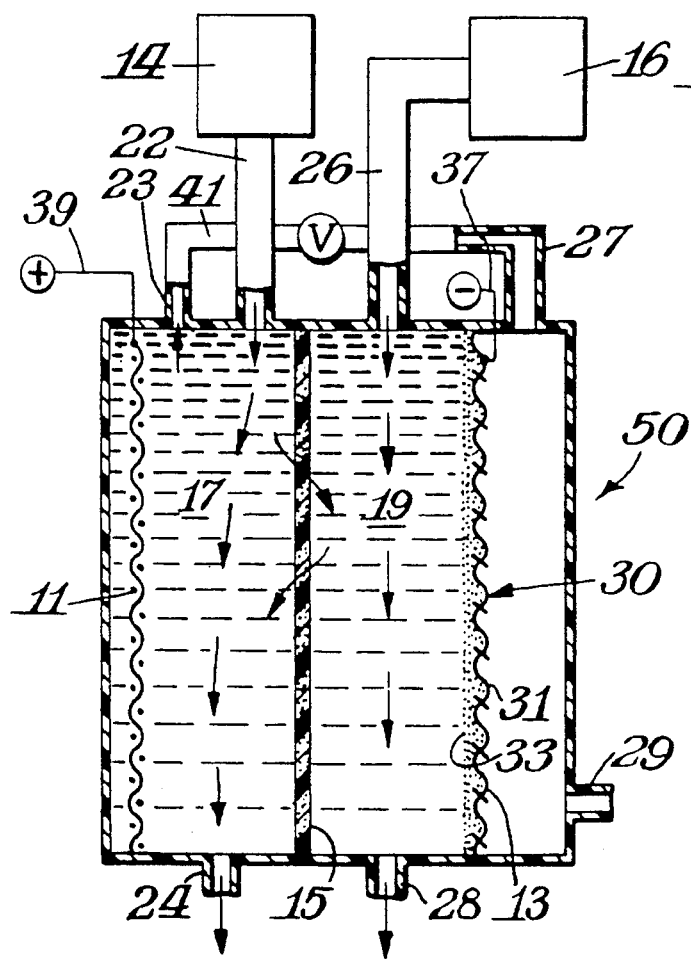
FIG. 2 is a schematic view, similar to FIG. 1, of an especially high-performance embodiment of an electrosynthesis cell of this invention which employs anolyte and catholyte flows which are generally separate but are in fluid communication with each other.

The oxygen-containing gas introduced through inlet 27 contacts the gas-permeable support material 31 of cathode 30 and permeates into the active material 33. Because of the permeation of catholyte into active material 33, this portion of cathode 30 provides a multitude of sites for a three-phase interface of catholyte, oxygen-containing gas, and solid catalytic material. The oxygen is reduced to peroxide at this three-phase interface, and the perhydroxyl ions diffuse into the catholyte. Turning now to FIG. 2, the cell 50 shown in this Figure is preferred for more controllable contact times between catholyte and cathode 30, hence, a more controllable production of peroxide. In addition, the cell design shown in FIG. 2 may allow for the decoupling of current efficiency and product ratio due to the independent catholyte and anolyte flows. The flow of catholyte through cathode compartment 19 is rapid enough to prevent any significant migration of perhydroxyl ion into anode chamber 17, thereby eliminating the need for a countercurrent flow of electrolyte. In this embodiment, fresh anolyte (from source 14) of independently selected alkalinity continuously enters through inlet 22, thereby keeping the hydroxide ion concentration in anode compartment 17 from being excessively depleted, and the spent anolyte flows out through outlet 24. On the cathode side of cell 50, fresh catholyte (from source 16), also of independently selected alkalinity, enters through inlet 26, and the product of the electrosynthesis flows out through outlet 28. The fresh influx of catholyte through inlet 26 and the constant efflux of catholyte prevent excessive buildup of hydroxide ion in cathode compartment 19, which is very important with respect to maintaining proper control over the hydroxyl/perhydroxyl ratio of the product effluent. As indicated previously, this ratio can be varied from as low as 1.6:1 to all higher values. Hydroxyl/perhydroxyl ratios as high as 2:1 or even 1.8:1 are unsuitable for many important industrial uses of alkaline peroxide solution, whereas hydroxyl/perhydroxyl ratios as low as 1:1 can create problems in the operation of cells 10 or 50. Accordingly, the particularly preferred hydroxyl/perhydroxyl ratio is in the range of 1.2:1 to 1.7:1.

In this invention, it is preferred to utilize the essentially pure oxygen produced at anode 11. This objective is most easily accomplished by circulating the oxygen through a conduit system 41, external to cell 50, to enrich the oxygen-containing gas introduced through inlet 27 on the cathode side of cell 50. System 41 can be used in cell 10 also, but for simplicity of illustration, system 41 is shown only in association with cell 50.

Except for the flowing electrolyte arrangement (compare inlet 21 and outlet 25 of cell 10 with inlets 22 and 26 and outlets 26 and 28 of cell 50), it will be noted that cells 10 and 50 can otherwise be substantially identical in structure and operation.

The loading of gold or gold alloy in the active material 33 of cathode 30 (of FIGS. 1 or 2) can range from 0.1 to 50% by weight, based on the weight of active material 33. Loadings in the range of 2 to 20% are preferred. Details of the structure of cathode 30 can best be seen in FIG. 3, which shows hydrophobic support material 31 (optionally treated with a hydrophobic polymer such as polytetrafluoroethylene or a similar fluorinated hydrocarbon), active material 33, and current collector or lead 37. The details shown in FIG. 3 relate to cathode 30 of both FIGS. 1 and 2, because the structure of cathode 30 is identical in both of those Figures.

Preferred materials for the separator 15 of FIG. 1 include alkali-resistant porous inorganic oxides and silicates and the like and porous organic polymeric materials which resist strong alkalis, e.g. microporous polyolefins. The separator 23 of FIG. 2 is a like material, but cation exchange membranes can also be used in the embodiment of FIG. 2. The preferred anode 11 is an alkali-resistant bulk metal such as nickel or a noble metal, which is preferably porous (e.g. a metal screen or mesh or "expanded metal"). The preferred electrolyte is an aqueous alkaline medium such as an aqueous solution of an alkali metal hydroxide, a highly water-soluble alkaline earth metal hydroxide, or a highly water-soluble quaternary ammonium hydroxide. Alkali metal hydroxide solutions are preferred, and sodium particularly preferred from the cost standpoint.

The preferred oxygen-containing gas introduced through inlet 27 is substantially pure oxygen or a mixture of oxygen with an essentially inert gas such as nitrogen or argon. A particularly convenient way to obtain a suitable $O_2/N_2$ mixture is to remove the carbon dioxide content of air, e.g. through a compression/condensation or alkaline-scrub technique. Since carbon dioxide can form carbonates in an alkaline electrolyte, and since some carbonates (even alkali metal carbonates) can be less soluble than the corresponding alkali metal hydroxides at cell operating temperatures, resulting in precipitation of carbonate salt in the pores of the cathode, the presence of carbon dioxide in the electrolyte is preferably avoided.

The Active Material

It is well known in the art that a gold-containing electrocatalyst of a gas-diffusion electrode in an alkaline electrolyte can facilitate the selective reduction of oxygen to peroxide ($O_2^{2\ominus}$, $HO_2^{\ominus}$, and/or $H_2O_2$, are well referred to in this application as "peroxide"), e.g. in accordance with half-cell reaction (2), above.

This reaction involves a "two electron change"—as opposed to the "four electron change" of the complete reduction of oxygen to hydroxide or water. It is also known that gold crystals can catalyze the four-electron change at the (100) face of these crystals, whereas the other crystalline faces (and polycrystalline gold) are specific for the two-electron change. See U.S. Pat. No. 5,041,195 (Taylor et al), issued Aug. 20, 1991, the disclosure of which is incorporated herein by reference. Although gold-containing electrocatalysts could theoretically be very effective in improving the performance of a peroxide electrosynthesis cell, and although gold is very stable (resistant to corrosion) in alkaline electrolytes, there appears to be very little discussion in the patent literature regarding the use of such electrocatalysts for this purpose, particulate carbon being the material most typically mentioned as suitable for catalysis of the electrosynthesis. Despite its promise of improved peroxide production, formulation of gold-containing electrocatalytically active materials of suitable efficiency can be problematic, and prior art appears to provide very little detailed guidance in this regard.

Surprisingly, the basic principles involved in supporting tiny gold particles on high surface-area carbon, disclosed in the U.S. Pat. No. 5,041,195 cited above, have been found to be highly useful in the context of this invention, even though these principles relate to gold catalysts specific for the four-electron reaction (complete reduction to hydroxide or water) rather than the two-electron reaction (partial reduction to peroxide). It has been found that relatively minor modifications of the techniques described in the U.S. Pat. No. 5,041,195 can provide gold or gold alloy particles which selectively catalyze the two-electron, peroxide-forming reaction.

The techniques of the U.S. Pat. No. 5,041,195 are directed toward maximizing the formation of tiny monocrystals (averaging less than 50 Å, more typically <40 Å, in size) which are selective for the four-electron reaction. To obtain supported gold or gold alloy particles which are specific for the two-electron change but are otherwise prepared in accordance with the U.S. Pat. No. 5,041,195, one can utilize graphitized carbon as the support material and/or select conditions favoring the formation of somewhat larger metallic particles (i.e. particles having an average size of at least 40 Å, but generally less than 200 Å and preferably about 50 to about 150 Å). It has been found that the tiny monocrystalline particles produced according to the U.S. Pat. No. 5,041,195 can serve as nucleation sites for the "growth" of somewhat larger particles of almost any desired size within the aforementioned preferred range of 50 to 150 Å. For example, the technique described in the U.S. Pat. No. 5,041,195 can be followed exactly, and the resulting gold-containing nucleation sites can be subjected to a heating step which sinters together some of tiny metallic particles, thereby increasing their average particle size to <50 Å (<5 nm).

Suitable catalyst support materials include high surface area carbon and other finely divided inorganic materials (e.g. metallic oxides or the like). Finely divided carbon is presently preferred due to its commercial availability in a range of particle sizes and due to its desirable inherent catalytic properties. When measured by the B.E.T. method, carbon powders such as furnace blacks, lamp blacks, acetylene blacks, channel blacks, and thermal blacks can provide surface areas ranging from 50 m²/g up to almost 2000 m²/g, surface areas >200 m²/g, e.g. >600 m²/g being preferred. The particle sizes of the carbon in these powders can range from about 5 to about 1000 nanometers (50 to 10,000 Å) but are preferably smaller than 300 nanometers in size. Since the surface area of the gold or gold alloy particles is normally less than that of the high surface area carbon, at least some carbon is exposed to the alkaline electrolyte and is subject to chemical attack, but adequate stability in alkaline media can be obtained with cathodes prepared according to this invention.

Commercially available carbon materials include BLACK PEARLS (trade designation), KETJENBLACK (trade designation), VULCAN (trade designation), "CSX", and Lurgi blacks, BLACK PEARLS and KETJENBLACK being preferred. These materials are described in detail in U.S. Pat. No. 5,041,195, and this description is specifically included in the subject matter incorporated by reference from the U.S. Pat. No. 5,041,195.

As indicated above, the preferred method for depositing (forming in situ) gold or gold alloy particles on high surface area carbon is a modification of the methods disclosed in U.S. Pat. No. 5,041,195. Generally speaking, a reducible gold compound in solution is impregnated into the support material with the aid of a polar solvent (e.g. an alcohol or alcohol/water mixture) having adequate wetting characteristics with respect to the support material, the solvent is gently evaporated at moderate temperatures (higher temperatures can be used to obtain somewhat larger gold particles), and the resulting dry or substantially dry material is subjected to chemical reduction with a reducing gas such as substantially dry hydrogen. The reducible gold compound can be chlorauric acid (HAuCl$_4$), a salt of this acid, a gold halide, or the like. The resulting gold particles can be smaller than 40 Å in size, but, as indicated above, they can also serve as nucleation sites for further particle growth (e.g. by sintering, as indicated previously). The most preferred active material thus comprises a rather high-surface area gold deposited on an even higher surface area carbon.

As indicated previously, the active material preferably contains at least 30%, generally about 50 to 70 weight-% of polymeric hydrophobic binder. The binder can be introduced into the active material, during its preparation, as a suspension of fine particles of hydrophobic polymer in a carrier such as water or an organic solvent.

The peroxide yield is variable and can readily provide the range of 3–5 wt % and NaOH/H$_2$O$_2$ ratio not exceeding about 2:1 typically desired by the pulp and paper industry.

The following Example illustrates the principle and practice of this invention without in any way limiting its scope.

Part A

Cathode Preparation Step

Cathodes were prepared as gas-diffusion electrodes (GDE's) from carbon-fiber paper as the gas-permeable support layer and a single deposit of an electrocatalyst layer (electrochemically active material). The preparation process was begun by first sieving the particulate carbon, which is itself an but was used as catalyst support material in this Example, through a –170 mesh (U.S. or Tyler) screen. The particulate carbon support material was then dispersed in an acidified aqueous solution (65 millimolar sulfuric acid). Ultrapure water was used to make this acidified aqueous solution. The carbon was added to the acidified aqueous solution with stirring and ultrasonification such that when the entire solution was applied to the carbon-fiber paper the electrocatalyst loading was 5 mg/cm$^2$. For each 10 cm×10 cm of electrode area the carbon mass was typically 0.517 grams. A polytetrafluoroethylene (PTFE) binder was then added (30, 50, or 70 wt %), using a dilute aqueous suspension of "TFE-30" (trade designation of the DuPont Company), and the suspension was mixed with stirring and ultrasonification. The resulting blend was filtered and the filtrate (deposit on the filter paper) was transferred onto wet-proofed, porous carbon-fiber paper substrate (Toray Industries) to form a uniform layer. The electrode was subsequently cold pressed at 1200 pounds pressure for each 16 in$^2$ of electrode area (75 psi, 517 kPa) until dry, hot pressed up to 1200 pounds pressure (75 psi, 517 kPa) for five minutes at 100° C., and sintered stepwise at 100° C. for one hour, 200° C. for an hour, then finally at 300° C. for fifteen minutes.

To produce an electrocatalyst layer with small gold particles required the previously-described modification to the process described in U.S. Pat. No. 5,041,195. This patent details the techniques directed toward maximizing the formation of tiny monocrystals (averaging less than 50 Å, more typically >40 Å, in size) which are selective for the four-electron reaction. To obtain supported gold or gold alloy particles which are specific for the two-electron change but are otherwise prepared in accordance with the U.S. Pat. No. 5,041,195, one can utilize graphitized carbon as the support material and/or select conditions favoring the formation of somewhat larger metallic particles (i.e. particles having an average size of at least 40 Å, but generally less than 200 and preferably about 50 to about 150 Å). It has been found that the tiny monocrystalline particles produced according to the U.S. Pat. No. 5,041,195 can serve as nucleation sites for the "growth" of somewhat larger particles of almost any desired size within the aforementioned preferred range of 50 to 150 Å. In this Example, the technique described in the U.S. Pat. No. 5,041,195 can be followed exactly and is incorporated herein by reference, except that the resulting gold-containing nucleation sites were subjected to a heating step in an inert atmosphere at temperatures ranging from 300° to 1200° C. which sintered together some of tiny metallic particles, thereby increasing their average particle size to >50 Å (>5 nm).

Part B

Peroxide Generator Apparatus

Two size systems were used to test and evaluate the cathodes and their performance. Both types employed three-compartment, flowing electrolyte designs as shown in FIG. 2 of the Drawing. The system of smaller size was constructed by the present applicants and was used for small cathodes of area not exceeding 3.0 cm$^2$. These cells were constructed from polymethylmethacrylate (LUCITE®) with a total cell volume of approximately 10 ml. A constant electrolyte flow was maintained by a peristaltic pump and the electrolyte was recirculated from a continuously mixed 600 ml reservoir. As shown in FIG. 2, the electrolyte compartment was partitioned into two separate compartments by a cation exchange membrane, NAFION® 117 (trademark of the DuPont Company for fluorinated cation exchange polymer having pendent groups containing —SO$_3$H radicals). The anode electrode was a solid nickel sheet. The electrolyte temperature was maintained above 40° C. by feedback-controlled, in-line heaters through which the electrolyte passes. Electrolyte temperature was monitored by insertion of thermocouples into the fluid entrances and exits. A mercury/mercury oxide electrode was used as reference. The internal resistance of the cells was monitored through the use of an auxiliary platinum wire electrode in combination with an 800 IR Measurement System (Electrosynthesis Corp.). The cells were operated in constant current mode with a 3-Amp power supply. Four such cells were constructed and, typically, operated simultaneously with a computer-based data acquisition system.

A larger cell system with cathode area up to 100 cm$^2$ was prepared by adaptation of a commercial electrolyzer. This system was referred to as a process development unit (PDU), and comprised an EA ElectroCell MP (EA Corp., Sweden, obtained through the Electrosynthesis Corp.), suitably modified as described below. This cell was chosen over other possible commercial alternatives as it is more readily adapted for gas diffusion electrodes. The principal difference between this and the small apparatus was the variable cathode-anode spacing. The power supply was proportionately larger and was purchased from Power Ten Inc. In addition to a cation exchange membrane, NAFION® 117 (DuPont see previous description), an alternative, relatively inexpensive separator was also successfully used in the PDU. This was 7-mil (179-μm) thick TESLIN® (PPG Industries Inc.) which is a silica-based, porous, polymeric material. The TESLIN® separator was determined to perform as well as the NAFION® 117 membrane. Several changes to the EA ElectroCell MP (commercial system) were necessary to fully adapt it to serve as the PDU (unit for caustic peroxide generation via GDE's). These changes were:
(1) The picture frame cathode assembly was replaced with a machined graphite block. The addition of the graphite block provides physical support of the carbon backing layer necessary to compensate for hydrostatic pressure. The block also ensures a leak-free seal between the catholyte and gas compartments. We chose graphite to provide electrical contact and for corrosion resistance. The block was drilled with a matrix of holes to allow gas to uniformly contact the rear surface of the GDE. This matrix of holes accounted for approximately 10% of the active cathode area. Therefore, the cathode-side of the block was machined to form channels leaving only small pegs in which to contact the GDE. Total surface area of these pegs was approximately 10%. The channeling provided uniform gas-flow across the back side of the GDE and 90% cathode area utilization.
(2) The separator frames were replaced with components more compatible with elevated temperature operation. These frames define the cathode-anode gap and have mesh inserts which promote turbulence. The replacement frames were equipped with reinforced flow canals to resist deformation under pressure and elevated temperature.
(3) The solid nickel sheet anode was drilled with a matrix of holes to resemble a mesh. This modification was necessary to allow evolved gas to escape behind the anode, away from the membrane.
(4) Accurate temperature monitoring was also required. This was accomplished by insertion of Teflon®-tipped thermocouple probes directly into the caustic entrance and exit ports of the PDU.
(5) Shut-down of the PDU was necessary for changing gas cylinders and electrolyte and for short-term unattended operation, such as cathode break-in. At the open circuit potential, the cathode begins to oxidize immediately. Removing the electrolyte was insufficient to prevent this, since the cathode and membrane retain moisture for long periods. The PDU stand was modified to allow draining and flushing of the cell with deionized water.

A four-way valve was also added to the gas feed system to allow the cell to be nitrogen-purged to displace oxygen.

Part C

Performance Data

Cathodes composed of up to 10 wt % gold on KetjenBlack (trade designation for particulate carbon) were prepared as described in Part A and were mounted in the PDU apparatus as described in Part B. The system was operated at cell temperatures of 45°–50° C., with a total anode to cathode gap of 0.8 cm, and for an input electrolyte concentration of 10 wt % NaOH. Cell polarizations (i.e. total cell potential versus current density) of the gold on carbon electrodes were equal to or improved in comparison to the carbon black alone. In addition, the gold-catalyzed electrodes were capable of sustained operation at current densities equal to or exceeding 300 mA/cm$^2$. The performance of a 10 wt % gold-on-carbon electrode was 1.34 V at 100 mA/cm$^2$, 1.73 V at 200 mA/cm$^2$, and 2.08 V at 300 mA/cm$^2$.

The reporting operating conditions of the trickle bed cathode system are 2 V at 60 mA/cm$^2$. The operating potential for the gold-on-carbon electrode tested here is approximately 1.06 V at 60 mA/cm$^2$. Thus, for the same current density, a factor of two in power savings per part by weight of peroxide product can be realized. Alternatively, higher current operation may be performed to reduce overall system size thereby reducing the generator capitol costs. The 300 mA/cm$^2$ current density data indicates that in comparison to the trickle bed system, a GDE-based generator system may be reduced in total electrode area by up to a factor of five. This will translate to a significant reduction in generator system capitol costs since these costs are a linear function of electrode area. Further performance improvements, principally due to decreases in the IR losses, are expected as the gap is decreased to a reasonable commercial limit of 0.5 cm.

Cathode lifetime and cathode cost are critical parameters in determining commercial system operating costs. The more frequently the cells have to be replaced and the more expensive the cells cost, the higher the cost of the electrogenerated peroxide will be and the poorer the comparison will be with simple purchase and storage. Extensive testing of the electrodes in both size systems described in Part B have identified total electrode hydrophobicity to be a critical factor in determining cathode lifetime. The most successful cathodes have incorporated hydrophobic polyhalohydrocarbon polymer, preferably PTFE, into the carbon paper and contain >30 wt.-% PTFE (e.g. 50 and 70 wt.-%) in the electrocatalyst layer, i.e. in the electrochemically active material. With active material containing 50 to 70 wt.-% PTFE, the cathodes will survive for several thousand hours with only minor decreases in performance characteristics.

In view of the relatively low cost of the catalyst components described above, the use of gold in the active material does not increase the manufacturing cost of the gas-diffusion cathode beyond present goals for on-site peroxide generator markets in the U.S. and elsewhere.

What is claimed is:

1. An electrochemical cell for the production of an alkaline solution of peroxide, comprising:

a partitioning means for partitioning said electrochemical cell into an anode compartment and a cathode compartment, the anode compartment containing an anode and an aqueous alkaline anolyte, the cathode compartment defining a space containing a generally free-flowing aqueous alkaline catholyte, a gas-diffusion cathode having two major surfaces, said cathode occupying not more than a minor proportion of said space, said cathode compartment being constructed and arranged to permit generally unrestricted flow of the aqueous alkaline catholyte across a first major surface of said gas-diffusion cathode, said cathode compartment being provided with means for withdrawing peroxide dissolved in said catholyte from said space defined by said cathode compartment, the second major surface of said cathode being gas-permeable and being in contact with an oxygen-containing gas, said first major surface of said cathode comprising an electrochemically active material, said active material comprising:

a particulate catalyst support material having a surface area, by the B.E.T. method, of about 50 to about 2000 m$^2$/g, deposited on the particles of catalyst support material of said active layer, 0.1 to 50 weight-%, based on the weight of the active layer, of elemental metal polycrystal particles comprising gold, said poly-crystal particles having an average size, measured by transmission electron microscopy, which is at least 5 but less than about 20 nanometers, the structure of said poly-crystal particles consisting essentially of polycrystal combinations of essentially individual monocrystals, said poly-crystal particles being substantially selectively catalytic for the reduction of oxygen to peroxide ion or hydrogen peroxide, and electrical leads in electrical contact with said anode and said gas-diffusion cathode.

2. The electrochemical cell according to claim 1, wherein said partitioning means comprises a liquid-permeable separator for permitting diffusion of anions from said cathode compartment into said anode compartment.

3. The electrochemical cell according to claim 1, wherein said anode compartment includes inlet means for introducing aqueous alkaline anolyte thereunto and outlet means for permitting aqueous alkaline anolyte to flow out of said anode compartment, and wherein said cathode compartment includes inlet means for introducing aqueous alkaline catholyte thereunto.

4. The electrochemical cell according to claim 1, wherein said electrochemical cell is a bipolar cell which is electrically connected to at least one other electrochemical cell of substantially the same construction and having substantially the same mode of operation.

5. The electrochemical cell according to claim 1, wherein said gas-diffusion cathode comprises: a gas-permeable support layer providing said second major surface, said active material being supported on said gas-permeable support layer; wherein the particulate catalyst support material of said active material has a surface area, by the B.E.T. method, of at least about 200 m$^2$/g; and wherein said poly-crystal particles have an average size, measured by transmission electron microscopy, which is greater than 5 nanometers.

6. The electrochemical cell according to claim 1, wherein said anode comprises an alkali-resistant bulk metal.

7. The electrochemical cell according to claim 1, wherein said first major surface of said cathode comprises an electrochemically active material comprising:

said particulate catalyst support material, deposited on the particles of catalyst support material, said poly-crystal particles, and blended with said particulate catalyst support material, about 50 to about 70% by weight, based on the weight of the electrochemically active material, of a hydrophobic polymer.

8. The electrochemical cell according to claim 1, wherein said poly-crystal particles consist essentially of sintered monocrystals which, as individual monocrystals, are smaller than 5 nanometers in average size but have been sintered together to form larger, poly-crystal particles at least 5 nanometers in average size and smaller than 20 nanometers in average size.

9. The electrochemical cell according to claim 8, wherein said poly-crystal particles contain nucleation sites, said nucleation sites being monocrystals smaller than 5 nanometers in average size.

10. The electrochemical cell according to claim 8, wherein said poly-crystal particles are greater than 5 nanometers, but less than about 15 nanometers, in average size.

11. The electrochemical cell according to claim 1, which includes a collector for collecting oxygen produced by oxidation of hydroxide ion at the anode and a conduit for introducing the thus-collected oxygen into the oxygen-containing gas contacting the second major surface of said cathode.

12. The electrochemical cell according to claim 1, wherein said cell includes a pump for providing a flow of peroxide dissolved in said catholyte from said cell essentially before the peroxide can contact said anode and become oxidized to oxygen.

13. The electrochemical cell according to claim 1, in combination with an external source of alkaline medium external to said cell, said external source being in communication with said anode compartment.

14. The electrochemical cell according to claim 1, in combination with at least one external source of alkaline medium external to said cell, said external source or sources being in communication with said anode compartment and said cathode compartment.

* * * * *